Aug. 22, 1950     O. B. MAXIM ET AL     2,519,585
CAPPED PRONG RING
Filed Aug. 22, 1945
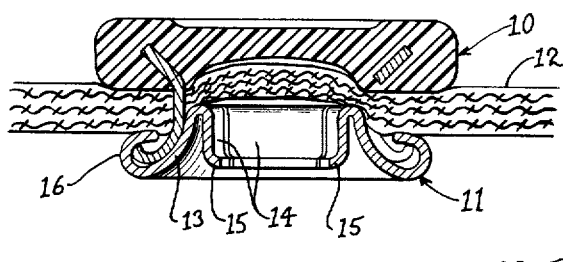
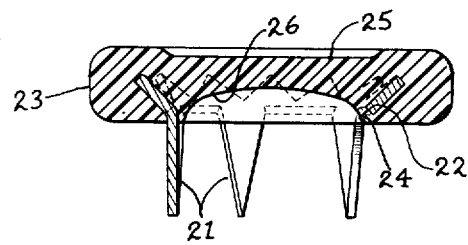
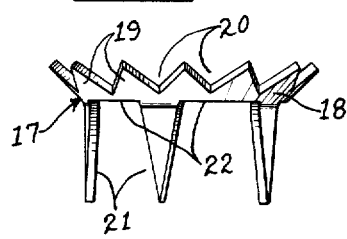
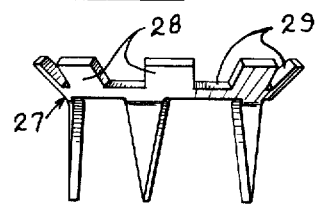
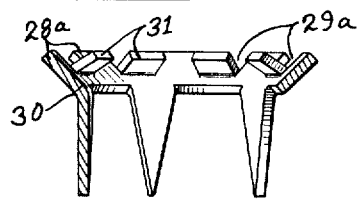
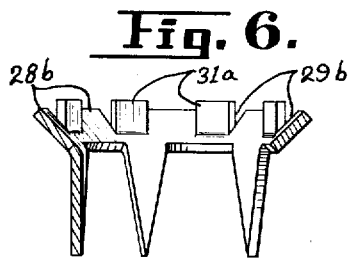
INVENTORS
Oren B. Maxim
BY Edmund D. Janes Patented Aug. 22, 1950

2,519,585

UNITED STATES PATENT OFFICE 2,519,585

CAPPED PRONG RING

Oren B. Maxim and Edmund D. Janes, Waterbury, Conn., assignors to Scovill Manufacturing Company, Waterbury, Conn., a corporation of Connecticut Application August 22, 1945, Serial No. 612,002

3 Claims. (Cl. 24—216)

1

This invention relates to prong rings for use in securing fastener devices of various kinds and classes to suitable supports. More particularly, the invention deals with rings of the type and kind having a die cast or molded cap, wherein the ring portion of the prong ring includes circumferentially spaced key members for keying the prong ring against rotation and pull-apart displacement with respect to the cap. The novel features of the invention will be best understood from the following descriptions, when taken together with the accompanying drawing, in which certain embodiments of the invention are disclosed and, in which, the separate parts are designated by suitable reference characters in each of the views and, in which:

Fig. 1 is a sectional view through a capped prong ring illustrating one use thereof in securing a socket member to a support.

Fig. 2 is a view similar to Fig. 1 showing the capped prong ring detached with the prongs extending in their normal position.

Fig. 3 is a side view of the prong ring, shown in Figs. 1 and 2, prior to attachment of the cap thereto.

Fig. 4 is a view similar to Fig. 3 showing a modification; and

Figs. 5 and 6 are sectional views showing other modified forms of prong rings which we employ.

Capped prong rings of the type and kind hereinafter more fully described are adapted for use in securing fastener devices of various kinds and classes to suitable supports. In illustrating one adaptation of the invention, we have shown in Fig. 1 of the drawing a capped prong ring 10 for securing a socket member 11 to a fabric support 12.

The socket member 11 has an annular downwardly and outwardly curved wall portion 13, sometimes referred to as a breast plate. Extending integrally from the upper end of the wall 13 are a plurality of circumferentially spaced downwardly and inwardly extending spring fingers 14, terminating at their lower ends in inwardly set flange portions 15 adapted to engage a companion stud member, not shown, against displacement from the socket member 11. The lower end portion of the wall 13 includes an upwardly and inwardly curved flange portion 16.

The capped prong ring 10 comprises a prong ring 17, shown in detail in Fig. 3 of the drawing. This ring comprises an annular upper wall portion 18 shaped to form a plurality of circumferentially spaced and substantially triangular

2 key members 19, between which are notches or recesses 20. Extending from the lower edge of the annular wall portion 18 are a plurality of circumferentially spaced prongs 21. The lower edge 22 of the annular wall portion 18 is so positioned in the die cast or molded cap 23 as to allow part of the material of the cap to overlie the edges 22 in forming key members, as at 24 at the right of Fig. 2 of the drawing.

The cap 23 may be of any desired peripheral contour and characterized in any desired manner. In the accompanying drawing, a recess 25 is shown in the upper surface thereof. The lower surface of the cap 23 has within the bounds of the prongs 23 a deep recess or chamber 26, which allows the material of the support 12 to extend thereinto in giving ample room for reception of the stud in the socket member 11, as will be apparent from a consideration of Fig. 1 of the drawing.

In forming the cast or molded cap 23, the same may be formed from any suitable die cast or moldable material, that is to say, metal or plastics and, from a standpoint of plastics, both the thermosetting and thermoplastic type of plastics may be employed. In casting or molding the cap 23, it will be apparent that the casting material extends into the recess 20 between the members 19, thus securely anchoring the prong ring against rotation in the cap. Further, it will appear that the members 19, including the wall portion 18, is flared and this flaring further serves to retain the prong ring against pull-apart separation from the cap.

In Fig. 4 of the dhawing, we have shown at 27 a slight modification of the structure shown in Figs. 1–3, which consists simply in providing rectangular key members 28 rather than the triangular key members 19. This results in the formation of rectangular recesses 29 between the key members 18 and, aside from these changes, the structure of Fig. 4 is identical with that shown in Figs. 1–3, inclusive.

In Fig. 5 is shown another adaptation of the structure shown in Fig. 4. In this figure, 28a represents key members similar to the key members 28; whereas instead of removing the material which would form the recesses 29, as in Fig. 4, this material of the annular wall portion 30 is bent inwardly to form supplemental key members 31. While the cap body is not shown applied to the structure of Fig. 5, it will be apparent, from a consideration of Fig. 1, that the supplemental key members 31 will be arranged in the plastic body of the cap beyond the limits of the recess 26. With the structure shown in Fig. 5, recesses 29a will be formed between the members 28, differing from the recesses 29 of Fig. 4 simply in including portions of the members 31.

In Fig. 6 of the drawing is shown a further adaptation of the structure shown in Figs. 4 and 5. In Fig. 6, 28b represents key members similar to the members 28, 28a, and 31a represents key members similar to the key members 31. However, in Fig. 6, the members 31a extend vertically, rather than angularly, as shown in Fig. 5. In this construction, the size of the openings 29b is minimized. However, in this construction, as well as in the structure shown in Fig. 5, the exposed side surfaces of all of the key members employed serve to provide ample anchorage for the prong ring against rotation in the cap. In all forms of construction shown, the annular wall portion of the prong ring, shaped in the manner illustrated and described, forms what might be termed an anchor or anchorage portion and is completely embedded in the molded cap.

By providing the additional key members as shown at 31 in Fig. 5 and 31a in Fig. 6, a greater reinforcement of the cap is provided and these reinforcements will materially assist in anchorage of the prong ring in the cap of the fastener device, particularly in outwardly flaring the prongs of the prong ring, for example, on the wall 13 and into engagement with the flange 16.

It will be apparent that the different forms of prong rings disclosed will be standardized, at least in different sizes, to adapt each size of ring for the reception of heads or caps of different shapes, contours or designs, the latter being controlled by the dies employed for casting or molding the caps on the rings. In this way, devices of this kind can be produced satisfying the requirements of the customer or user of the devices with respect to trade-marking or designing the capped prong rings to suit different uses by the customer.

Having fully described our invention, what we claim as new and desire to secure by Letters Patent is:

1. A capped prong ring comprising a plastic cap body, an annular wall completely embedded in said body, a plurality of prongs spaced circumferentially on and projecting from one edge of the wall and protruding from said cap body, said body extending below and overlying said edge and completely surrounding the prongs at said edge, said wall being flared for anchoring said prongs against displacement from the cap body, and the other edge of said wall terminating in circumferentially spaced key members retaining said wall against rotation in the cap body.

2. A capped prong ring comprising a plastic cap body, an annular wall completely embedded in said body, a plurality of prongs spaced circumferentially on and projecting from one edge of the wall and protruding from said cap body, said body extending below and overlying said edge and completely surrounding the prongs at said edge, said wall being flared for anchoring said prongs against displacement from the cap body, the other edge of said wall terminating in circumferentially spaced key members retaining said wall against rotation in the cap body, part of said key members extending outwardly, and other key members extending inwardly with respect to the annular wall.

3. A capped prong ring comprising a plastic cap body, an annular wall completely embedded in said body, a plurality of prongs spaced circumferentially on and projecting from one edge of the wall and protruding from said cap body, said body extending below and overlying said edge and completely surrounding the prongs at said edge, said wall being flared for anchoring said prongs against displacement from the cap body, the other edge of said wall terminating in circumferentially spaced key members retaining said wall against rotation in the cap body, part of said key members extending outwardly with respect to the annular wall, and other key members being arranged substantially parallel to the axis of said prong ring.

OREN B. MAXIM.
EDMUND D. JANES.

REFERENCES CITED

The following references are of record in the file of this patent:

UNITED STATES PATENTS

| Number | Name | Date |
| --- | --- | --- |
| 551,970 | Kempshall | Dec. 24, 1895 |
| 568,687 | Kempshall | Sept. 29, 1896 |
| 600,126 | Kempshall | Mar. 1, 1898 |
| 656,412 | Merrill | Aug. 21, 1900 |
| 701,476 | Force | June 3, 1902 |
| 910,861 | Richards | Jan. 26, 1909 |
| 2,051,405 | Cox | Aug. 18, 1936 |
| 2,164,386 | Chalfin | July 4, 1939 |
| 2,327,554 | Purinton | Aug. 24, 1943 |

FOREIGN PATENTS

| Number | Country | Date |
| --- | --- | --- |
| 149,978 | Germany | May 22, 1901 |